United States Patent [19]

Albers, Sr.

[11] 4,185,592
[45] Jan. 29, 1980

[54] CATTLE STANCHION APPARATUS

[76] Inventor: Teo Albers, Sr., P.O. Box 156, Artesia, Calif. 90701

[21] Appl. No.: 866,029

[22] Filed: Dec. 30, 1977

Related U.S. Application Data

[63] Continuation-in-part of Ser. No. 827,090, Aug. 19, 1977, abandoned, and Ser. No. 613,169, Sep. 15, 1975, Pat. No. 4,051,813.

[51] Int. Cl.² .................................................. A01K 1/08
[52] U.S. Cl. ...................................................... 119/148
[58] Field of Search ............... 119/148, 147, 149, 155, 119/98, 99

[56] References Cited

U.S. PATENT DOCUMENTS

| 549,965 | 11/1895 | Howard | 119/148 |
|---|---|---|---|
| 1,081,045 | 12/1913 | James | 119/148 |

FOREIGN PATENT DOCUMENTS

| 2221071 | 10/1974 | France | 119/148 |
|---|---|---|---|
| 2242929 | 4/1975 | France | 119/148 |
| 636215 | 4/1950 | United Kingdom | 119/148 |

Primary Examiner—Jay N. Eskovitz
Attorney, Agent, or Firm—Fulwider, Patton, Rieber, Lee & Utecht

[57] ABSTRACT

Cattle stanchion apparatus in which a plurality of fixed and release stanchions are located adjacent one another to define a row of head openings for the animals. The release stanchions are simultaneously pivotable between open and closed positions by a reciprocable release rod. Decouplers are operative upon movement of the release stanchions to their open positions to permit the release rod to be moved back to its previous position independently of the now open release stanchions. Each release stanchion is pivotable to its closed position by the animal as it dips its head to feed. In their closed positions the release stanchions reengage the release rod and, depending upon the position of the release rod, thereby automatically lock the cattle in place. When desired, the apparatus can be arranged so that the cattle cannot lock themselves in the apparatus until the release rod is moved by the operator.

15 Claims, 23 Drawing Figures

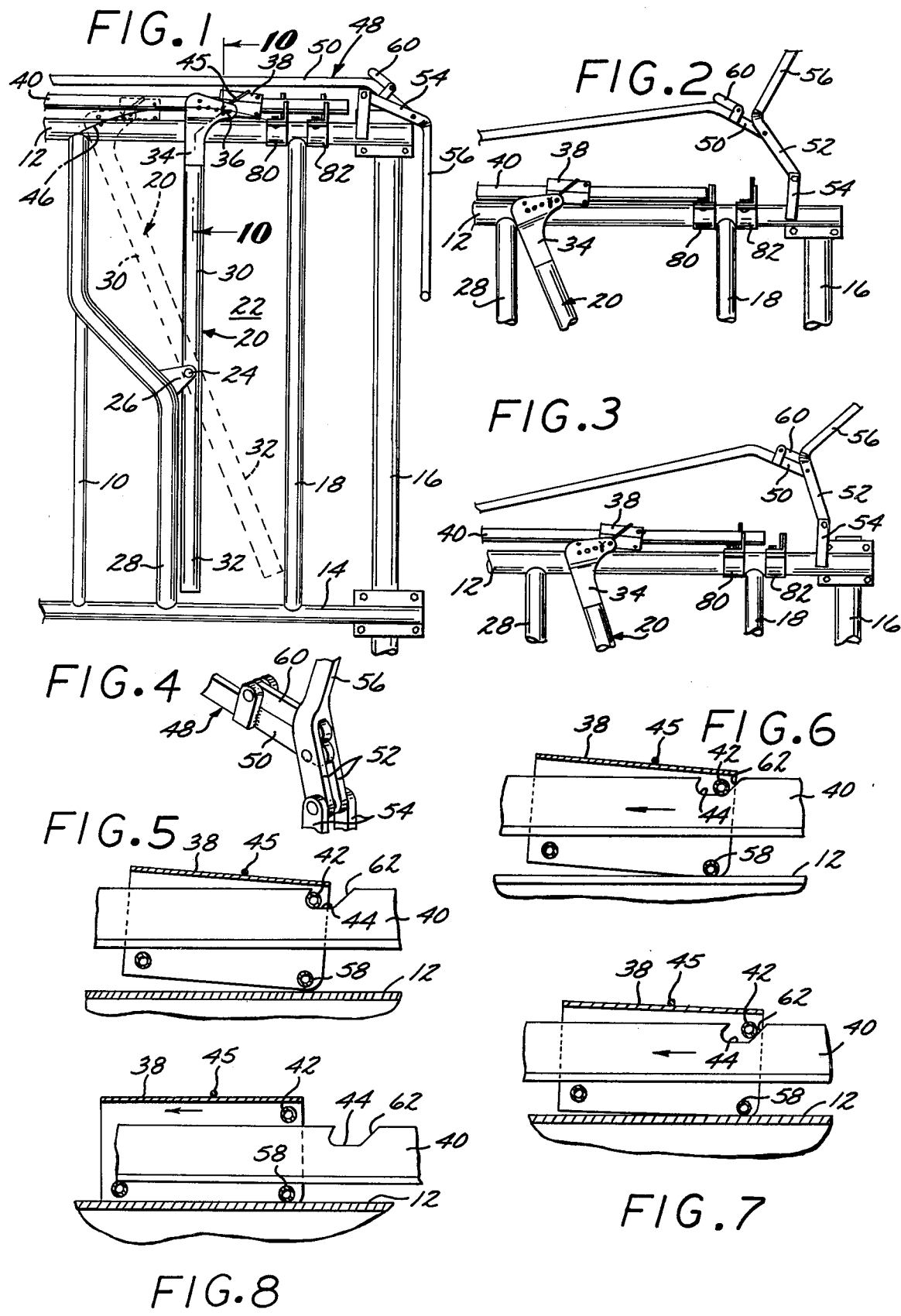

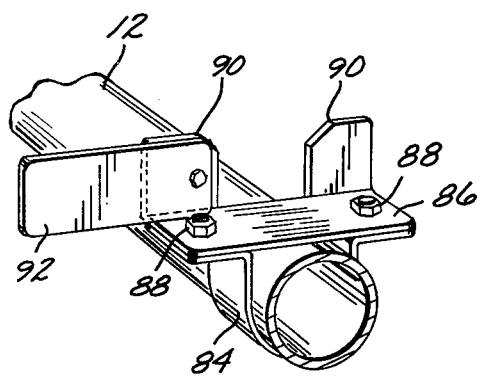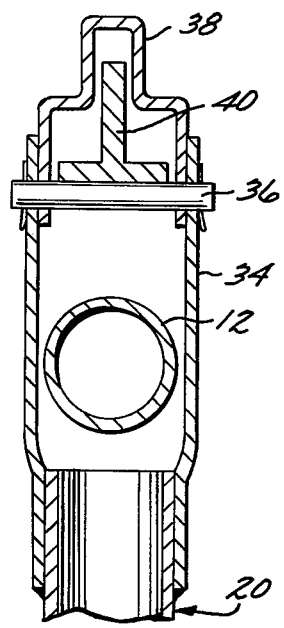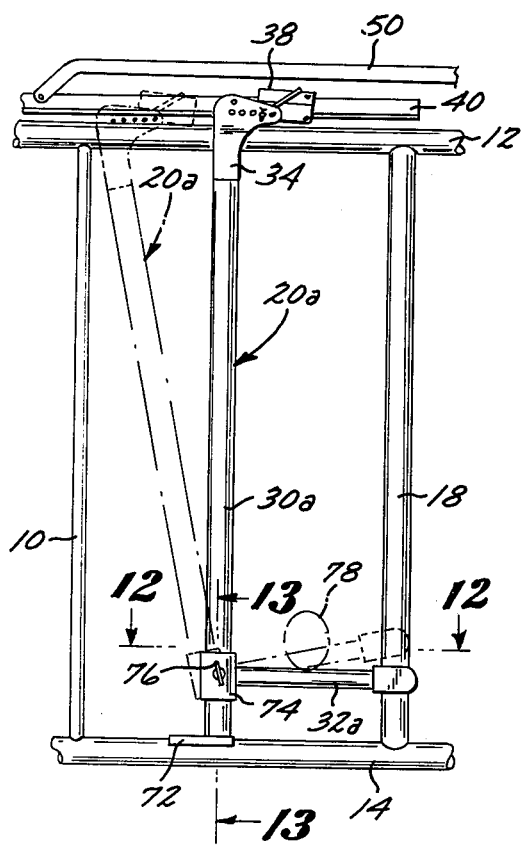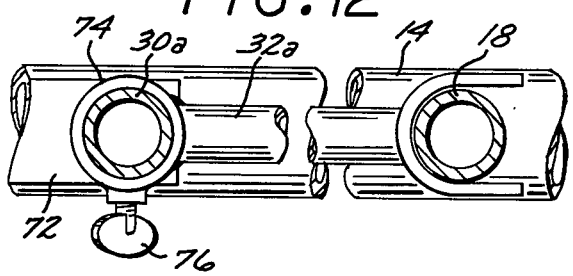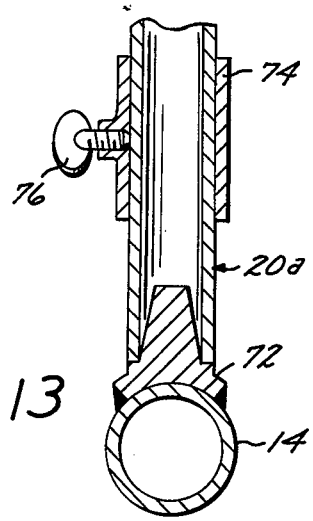

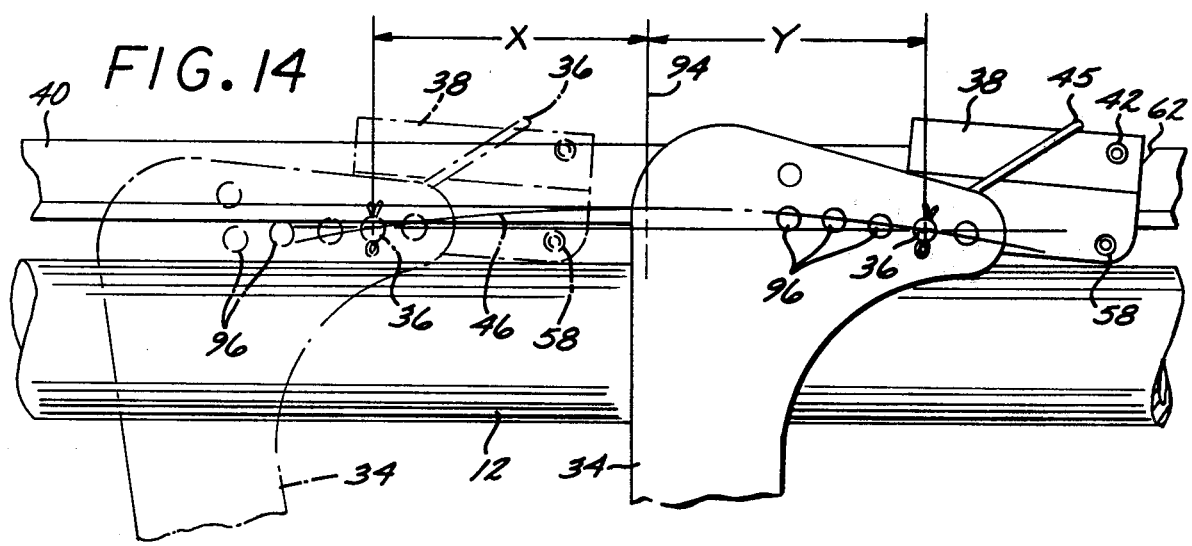
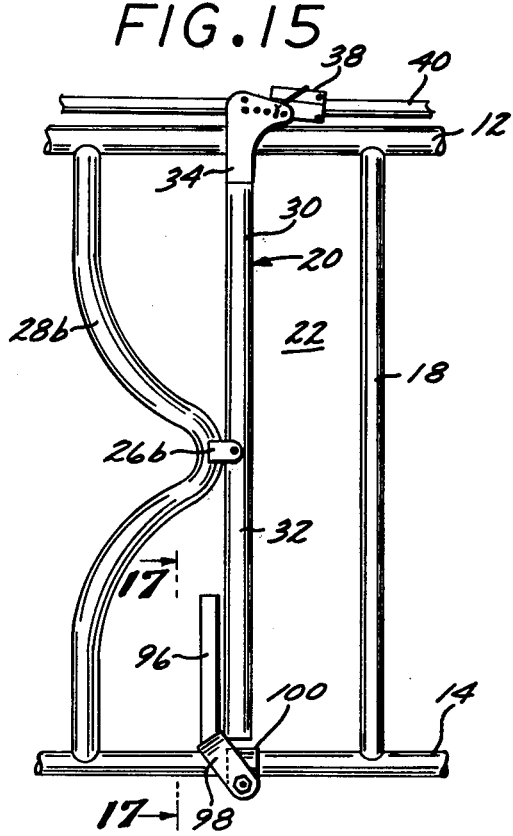
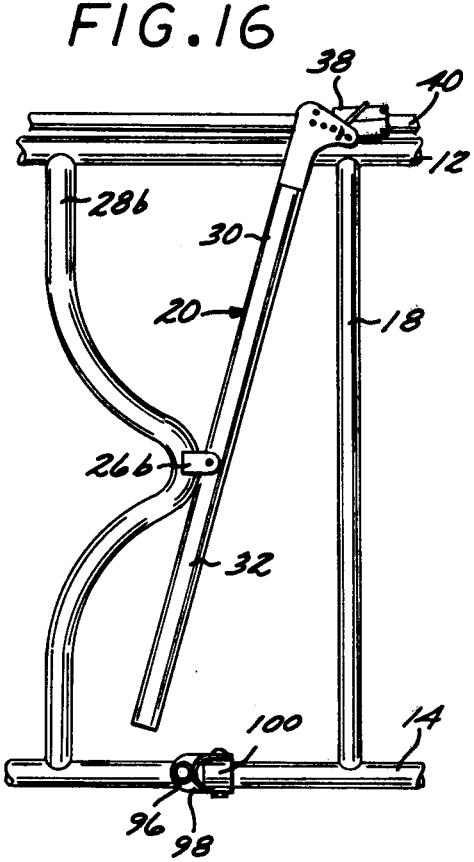
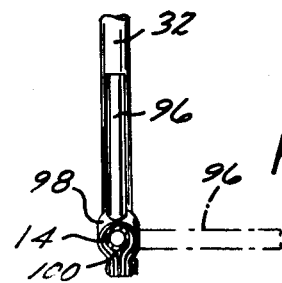

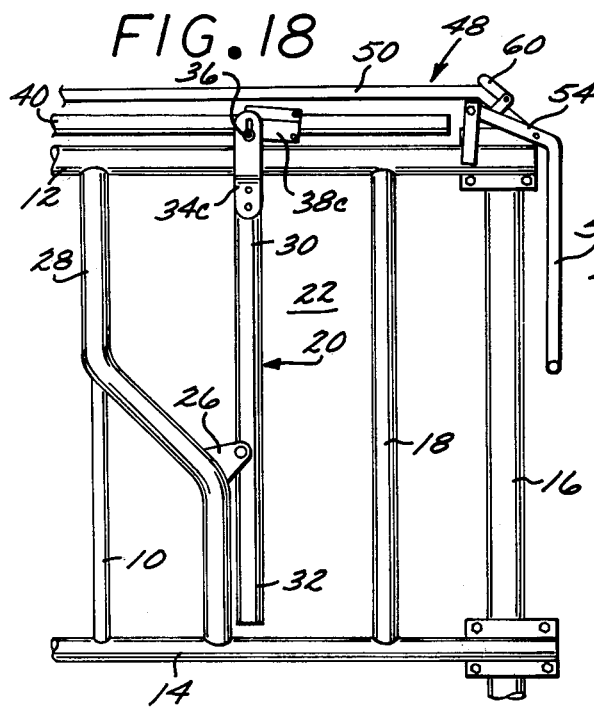
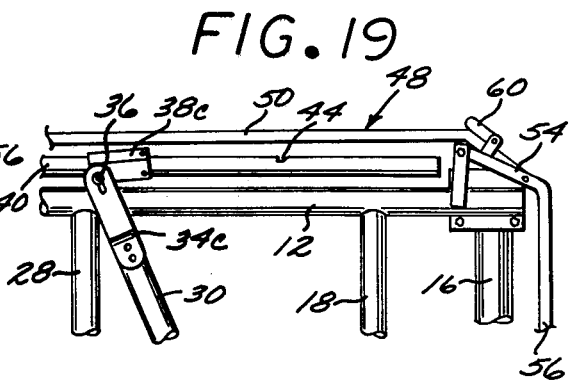
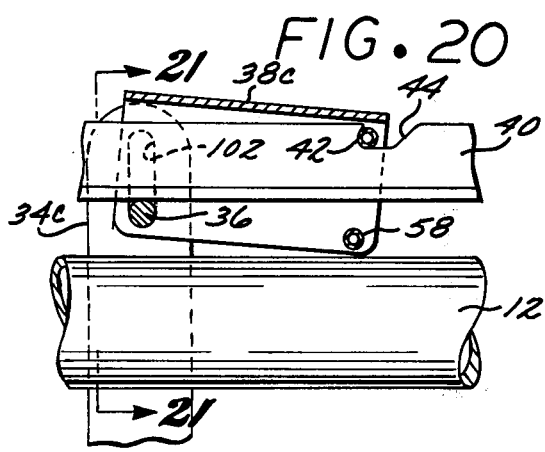
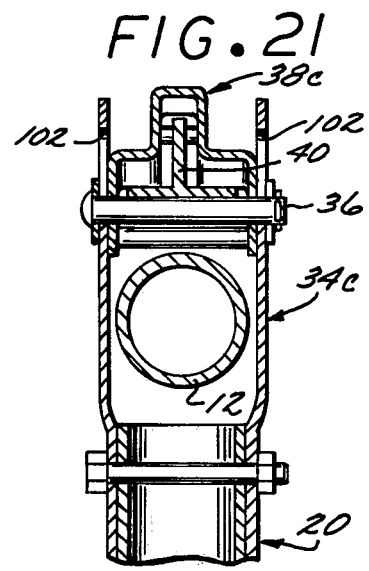
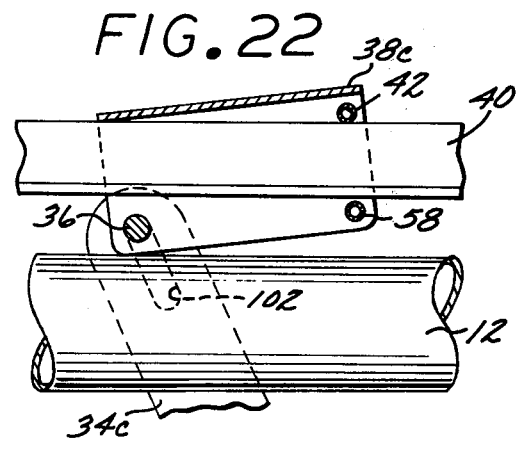
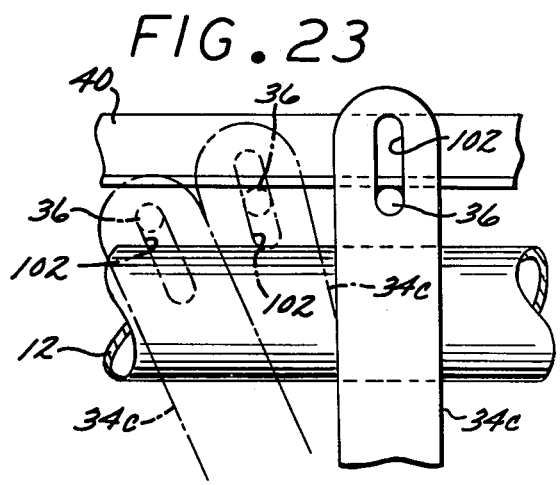

CATTLE STANCHION APPARATUS

CROSS REFERENCE TO RELATED APPLICATION

This is a continuation-in-part of applicant's copending applications Ser. No. 613,169, filed Sept. 15, 1975, now patent No. 4,051,813 entitled "Locking Stanchion for Cattle" and Ser. No. 827,090, filed Aug. 19, 1977, entitled "Cattle Stanchion Apparatus, now abandoned." Related apparatus is also disclosed in my U.S. Pat. No. 4,037,566, issued July 26, 1977 for "CATTLE LOCKING APPARATUS."

BACKGROUND OF THE INVENTION

1. Field of the Invention

The present invention relates to a cattle stanchion apparatus and more particularly to cattle stanchion apparatus capable of actuation by the cattle without the intervention of an operator.

2. Description of the Prior Art

Various types of cattle stanchion apparatus are disclosed in the prior art, and particularly in the applications previously identified. Such prior art apparatus employs decouplers secured at particular locations on the stanchion upper rail to decouple the release stanchions from the release rod and thereby enable movement of the release stanchions independently of the release rod. Such decouplers operate satisfactorily but are somewhat expensive to fabricate compared to the decouplers of the present apparatus. Such prior art apparatus also is incapable of permitting the cattle to free themselves in certain positions of the release rod. The present apparatus preferably utilizes actuators which enable opening of the release stanchions by the cattle in almost all positions of the release rod. One version of the present apparatus also facilitates operation of the release stanchions by smaller animals, such as calves.

SUMMARY OF THE INVENTION

The present invention provides a cattle stanchion apparatus in which a fixed stanchion and a release stanchion define a head opening for an animal, with the release stanchion being pivotally mounted for movement to an open position in which an associated actuator portion is presented for engagement by the neck of an animal placing its head in the head opening. In the open position of the release stanchion the upper portion thereof is pivoted away from the fixed stanchion to enlarge the upper part of the head opening. This enables an animal to place its head in the upper part of the opening and engage the actuator portion of the release stanchion on dipping its head to feed, as above mentioned. Such engagement pivots the release stanchion to a closed position in which its upper portion moves toward the fixed stanchion and thereby narrows the upper part of the head opening to lock the animal in the head opening.

Each release stanchion includes a coupling element detachably received in a release means which is reciprocably movable to pivot the release stanchions. The apparatus includes decoupling means engageable with each coupling element, respectively, to detach the coupling elements from the release means when the release stanchions are moved to their open positions. This permits the release means to be moved back to its locking position independently of the release stanchions, thereby leaving each release stanchion in position to be pivoted by an animal to a closed position. Upon such pivotal movement, the coupling element of the release stanchion re-engages the release means, in the locking position of the release means, and the release stanchion is then locked and held in its closed position.

If desired, the apparatus can be provided with means for preventing the coupling elements from becoming completely disengaged from the release means when the release means is moved toward its open position. This permits the operator to move the release means back toward its closed position and simultaneously move all of the release stanchions to their closed positions.

Also, the release means can be configured and oriented to permit the cattle, independently of the operator, to move the release stanchions freely between their open and closed positions. The cattle can then feed and leave as they wish. One embodiment of the invention enables relative vertical movement between the coupling elements and the release means whereby the release means does not have to be lifted to permit the release stanchions to be moved between their open and release positions.

Other objects and features of the invention will become apparent from consideration of the following description taken in connection with the accompanying drawings.

BRIEF DESCRIPTION OF THE DRAWINGS

FIG. 1 is a front elevational view of one end of a cattle stanchion apparatus according to the present invention, and illustrating the release rod in its locking position and the release stanchion in its closed position;

FIG. 2 is a partial front elevational view similar to FIG. 1, but illustrating the release rod moved to its fully open or second release position, and with the coupling elements of the open release stanchions decoupled from the release rod;

FIG. 3 is a partial front elevational view similar to that of FIG. 1, but illustrating the release rod in its first release position, with the coupling elements still coupled to the release rod;

FIG. 4 is an enlarged partial perspective view of the locking handle assembly in the position it is in in FIG. 3, and illustrating the means to limit the extent of travel of the release rod and thereby establish the first release position of the release rod;

FIG. 5 is an enlarged longitudinal cross-section of the coupling element of a release stanchion coupled to the release rod;

FIG. 6 is a view similar to FIG. 5, but illustrating the position of the coupling element upon opening movement of the release rod;

FIG. 7 is a view similar to FIG. 5, but illustrating the position of the coupling element coupled to the release rod in the first release position of the release rod, and corresponding to its position in FIG. 3;

FIG. 8 is a view similar to FIG. 5, but illustrating the position of the coupling element decoupled from the release rod, the release rod being illustrated in its locking position, which is to the right of the second release position in which the decoupling occurred;

FIG. 9 is an enlarged partial perspective view of a stop element to limit the extent of movement of the release rod;

FIG. 10 is an enlarged view taken along the line 10—10 of FIG. 1;

FIG. 11 is a front elevational view of a second embodiment of the present cattle stanchion apparatus, illustrating the components in locations corresponding to that illustrated in FIG. 1 for the first embodiment;

FIG. 12 is an enlarged view taken along the line 12—12 of FIG. 11;

FIG. 13 is an enlarged view taken along the line 13—13 of FIG. 11;

FIG. 14 is an enlarged front elevational view of a portion of the apparatus illustrated in FIG. 1, particularly detailing the relative locations of the coupling element, release stanchion and top rail;

FIG. 15 is a front elevational view of a third embodiment of the present cattle stanchion apparatus, illustrating the components in locations corresponding to that illustrated in FIG. 1 for the first embodiment, with the release stanchion in its closed position;

FIG. 16 is a front elevational view similar to FIG. 15, but illustrating the release stanchion pivoted to enable easier release of an animal's head from the lower portion of the head opening;

FIG. 17 is an enlarged view taken along the line 17—17 of FIG. 15;

FIG. 18 is a front elevational view of another embodiment of the present cattle stanchion apparatus, illustrating the components in locations corresponding to that illustrated in FIG. 1 for the first embodiment;

FIG. 19 is a partial front elevational view similar to that of FIG. 18, but illustrating the release stanchion in its open position, and with the release rod in its locking position;

FIG. 20 is an enlarged longitudinal cross-sectional view of the coupling element of the release stanchion of FIG. 18 coupled to the release rod;

FIG. 21 is an enlarged view taken along the line 21—21 of FIG. 20;

FIG. 22 is a view similar to FIG. 20, but illustrating the change in relative positions of the release stanchion and the coupling element upon movement of the release stanchion toward its open position; and FIG. 23 is a partially diagrammatic view of the successive changes in relative positions of the coupling element and the release stanchion as the release stanchion moves between its closed position and its open position.

DESCRIPTION OF THE PREFERRED EMBODIMENTS

Referring now to the drawings, there is illustrated a stanchion structure of the type in which a plurality of upright, horizontally spaced apart bars or rods 10, only a portion of one of which is illustrated, extend between and are welded to a tubular top rail 12 and a tubular bottom rail 14. The stanchion structure includes a plurality of tubular vertical end rails 16, only one of which is illustrated, which is secured to the ground or other supporting structure (not shown) at its lower end.

At horizontally spaced intervals, larger tubular fixed stanchions 18, only one of which is illustrated, are welded or otherwise rigidly secured at their upper and lower extremities to the top and bottom rails 12 and 14. An elongated release stanchion 20 is located adjacent each fixed stanchion 18 to define a head opening 22 for an animal.

Although only one fixed stanchion 18 and release stanchion 20 are illustrated, it will be understood that this arrangement is repeated at regular intervals along the length of the present apparatus to define as many head openings 22 as may be desired.

Each release stanchion 20 is mounted for pivotal movement between a closed position, as illustrated in FIG. 1, and an open position, as illustrated in FIGS. 2 and 3. In the embodiment illustrated, the pivotal movement is about an axis located between the opposite extremities of the release stanchion, the axis being defined by a pivot bolt 24 which extends through a bracket 26. The bracket 26 is welded to an angularly offset section of relatively heavy tubing 28 welded at its opposite ends to the rails 12 and 14. The partial rod 10 is welded at its upper end to the offset upper portion of the tubing 28 for support.

The offset upper portion of the tubing 28 defines an enlarged upper part of the head opening 22 when the release stanchion 20 is in its release position, as shown in dotted outline in FIG. 1.

The release stanchion 20 is preferably pivotally mounted below its midpoint so that it is heavier above the pivot bolt 24 and will therefore tend to remain in its open position in the absence of any positive movement urging it toward its closed position. In its open position, as illustrated in FIGS. 2 and 3, the longer upper portion 30 of the release stanchion 20 is pivoted away from the fixed stanchion to enlarge the upper part of the head opening 22, thereby enabling an animal to place its head through the head opening.

The release stanchion 20 includes an actuator or lower portion 32 which projects into the lower part of the head opening 22 when the release stanchion is in its open position. In the closed position of the release stanchion 20, as illustrated in FIG. 1, the upper portion 30 is pivoted toward the fixed stanchion 18 and narrows the upper part of the head opening 22, while the lower portion 32 simultaneously pivots away from the fixed stanchion 18 to widen that part of the head opening 22. This enables an animal with its head in the upper part of the head opening 22 to move its head downwardly into the lower part of the head opening 22 to feed from a trough (not shown) located below or at the level of the bottom rail 14.

A U-shape bracket 34 is secured to the upper end of each release stanchion 20, the opposite legs of the bracket 34 straddling opposite sides of the top rail 12, as best seen in FIG. 10. Sufficient clearance exists between the top rail 12 and the interior walls of the bracket 34 to enable the bracket 34 to move generally longitudinally relative to the rail 12.

The upper portions of the legs of the bracket 34 mount the opposite ends of a pivot pin 36 which extends across the top of the top rail 12 and through the opposite sides of a generally channel shape coupling element 38. The element 38 straddles an elongated release rod 40 of inverted T-shape, as best seen in FIG. 10.

The release rod 40, which overlies and extends substantially parallel to the top rail 12, also overlies the pin 36. The rod 40 is movable to the left to its first and second release positions, as will be seen, and is movable to the right to the locking position illustrated in FIG. 1.

The upper portion of each coupling element 38 includes an interior of generally inverted T-shaped cross-section to complementally conform to the cross-section of the release rod 40. With this complementary configuration, the coupling element 38 and release rod 40 are slidable relative to one another. As will be seen, the present apparatus provides for releasable coupling of the release stanchion 20 to the release rod 40 for common movement therewith by means of a pin 42, as best seen in FIGS. 5 through 8. The pin 42 is received within an upwardly open, specially configured slot 44 provided in the release rod 40, as viewed in FIGS. 5 through 8. A usual torsion spring 45 is suitably connected to the bracket 34 and overlies the coupling element 38 to bias the pin 42 into the slot 44.

With the pin 42 in the slot 44, any movement of the release rod 40 between its release positions and its locking position is accompanied by corresponding movement of the release stanchion 20 from its open position to its closed position. However, the coupling element 38 may be lifted manually against the bias of the spring 45 to remove the pin 42 from the slot 44 and thereby enable movement of the release stanchion 20 independently of the release rod 40. This permits the operator to open one stall or head opening 22 without opening the other stalls. Disengagement of the pin 42 from the slot 44 can also be effected by a decoupling mechanism or by the animal, as will be described later.

The path of travel of the upper extremity of the release stanchion 30 is along an arc 46, as best seen in FIGS. 1 and 14. As a consequence, the coupling element 38 comes into closer proximity with the top rail 12 as the release stanchion moves from its closed to its open position. This is illustrated in FIGS. 6 through 8. The relative positions of the coupling element 38 and the top rail 12 are important in effecting decoupling of the element 38 from the release rod 40, as will be described later.

Various forms of coupling element 38 may be used in conjunction with the present apparatus. Exemplary forms are disclosed in my copending patent application Ser. No. 613,169. However, the element 38 herein disclosed is preferred.

As best seen in FIGS. 1 through 4, movement of the release rod 40 is effected by actuation of a locking handle assembly 48 connected to one end of the rod 40. The assembly 48 includes an elongated bar 50 pivotally connected at one end to the rod 40 (not shown) and at the other end between a pair of legs 52 which are pivotally connected at their lower ends to a pair of straps 54 fixed to the upper rail 12. The upper ends of the legs 52 merge and extend upwardly to define a manually operable handle 56. The handle 56 is movable between the positions illustrated in FIGS. 1 and 2 to move the release rod 40 back and forth.

A decoupler in the form of a pin 58 is provided to enable automatic disengagement between the rod 40 and the element 38. The pin 58 extends between the opposite sides of the coupling element 38 in overlying relation to the top rail 12, as best seen in FIGS. 5 through 8. With this arrangement, as the element 38 moves with the rod 40 along the arc 46 toward the release positions of the rod 40, there is a convergence of the decoupler pin 58 toward the top rail, as seen in FIGS. 5 and 6. Thus, as movement of the rod 40 continues, the rod reaches a first release position, as illustrated in FIG. 7, in which the pin 42 still remains within the slot 44. At this point the release stanchion is open sufficiently to allow the animal to insert its head in the upper part of the head opening 22. The animal can now lower its head to feed by pressing against the lower portion of the release stanchion 20, moving it to its closed position. Such movement of the release stanchion 20 and its associated coupling element 38 is permitted because of the special configuration of the slot 44. As best seen in FIGS. 5 through 8, the left end of the slot is undercut to trap the pin 42 during travel of the release 40 to the right. However, the right end of the slot 44 is sloped to provide a ramp 62 along which the pin 42 can ride upwardly for disengagement of the element 38 from the rod 40. Thus, with the rod 40 having been moved by the operator to the first release position illustrated in FIGS. 3 and 7, and with the release stanchion 20 in the dotted line position illustrated in FIG. 1, an animal can feed by inserting its head into the head opening 22 and pressing downwardly against the stanchion portion 32. Pin 42 is moved against the bias of the spring 45 and slides out of the slot 44 to the right, as viewed in FIG. 7, and the release stanchion 20 pivots clockwise. If the animal wishes to leave the stanchion, it presses against the upper portion 30 of the release stanchion 20, the stanchion then pivots open, and the animal is free to move. However, the release rod 44 remains under the control of the operator in the sense that if the operator wants to lock all the stanchions, the pins 44 are located sufficiently within the associated slots 44 in the first release position of the release rod 40 that the operator is able to move all of the release stanchions to their locked positions by moving the release rod 40 to the right.

In contrast, there is a second release or fully open position of the release rod 40, which, with reference to FIG. 8, is established when the rod 40 is moved all the way to the left. The elements 38 each move in an arcuate path until the pins 58 engage the top rail 12 and raise the pins 42 upwardly and out of the slots 44. FIG. 8 illustrates the pins 42 in this raised position, but with the rod 40 having been moved back to the right to its locking position. In the positions of the elements 38 illustrated in FIG. 8 the operator cannot use the rod 44 to move them and the associated stanchions to the right, to the closed positions of the stanchions, because the pins 42 are out of the slots 44.

In the right most or locking position of the release rod 40, as seen in FIG. 8, each detent or slot 44 is located to the right of its associated pin 42 in position to re-engage the pin 42 when the release stanchion 20 is pivoted clockwise back to its closed position. Such pivotal movement of the stanchion 20 to its closed position can be initiated by an animal moving its head downwardly in the opening 22 and against the lower portion of the stanchion 20. Once this is done, the associated pin 42 drops into its slot 44 and the animal cannot move the stanchion 20 counterclockwise to release itself because the pin 42 is stopped by the left or undercut end wall of the slot 44.

Thus, to open all the stanchions for feeding, and to lock each animal in after it begins feeding, the operator first actuates the locking assembly handle 48 to move the release rod 40 past its first release position to its second release position, as illustrated in FIG. 2. In this position, the release stanchions 20 are all located in their fully open positions, as illustrated in dotted outline in FIG. 1. In addition, the coupling elements 38 are automatically detached from the release rod 40 by interengagement between the pins 58 and the top rail 12, as shown in FIG. 8. The operator can now move the locking handle assembly 48 to move the release rod 40 to the right, independently of the release stanchions 20, into the locking position illustrated in FIGS. 1 and 8. In this position of the release rod 40, the operator is not able to re-engage the elements 38 of the release stanchions to move them to locked position, as previously mentioned. In order to retain this capability for re-engagement the operator would limit his initial leftward movement of the release rod 40 to the first release position shown in FIG. 7.

With the release rod 40 in its locked position of FIGS. 1 and 8, an animal placing its head in the opening 22 and dipping its head to feed effects pivotal movement of the release stanchion 20 into the locking position illustrated in FIG. 1. In this position the pin 42 of the coupling element 38 is received within the slot 44. In this manner individual animals can lock themselves in the feeding stalls without the intervention of an operator.

When the operator wishes to move the release rod 40 only to its first release position, which would thereafter permit him to lock all the stanchions again by simply moving the release rod 40 to the right, the operator moves the handle 56 into the position of FIG. 3. Then, as best seen in FIG. 4, the operator pivots a stop link 60 from its position in FIGS. 1 and 2 to the position shown in FIGS. 3 and 4. The link 60 is pivoted at one end to the bar 50 and when its free end is located in the space between the bar 50 and the juncture of the legs 52, further pivotal movement of the handle 56 to the left is prevented. This "stop" position corresponds to the position of the element 38 and the first release position of the release rod 40, as illustrated in FIG. 7. It is noted that in this position of the release rod 40 the cattle can enter and leave the stanchions as they wish since the coupling elements 38 are easily moved to the right by sliding of the pins 42 over the ramps 62 and out of the slots 44.

It is noted that the bias or strength of the torsion spring 45 is such that it is effective to maintain the pin 42 within the slot 44 when the operator moves the rod 44 to the left toward its release position. However, the bias of the spring 45 is insufficient to prevent an animal from effecting travel of the pin 42 up the ramp 62 by pressing against the stanchion portion 32, and moving the stanchion 20 clockwise, when the components are in the positions illustrated in FIG. 6.

As best seen in FIGS. 1 through 3 and 9, a pair of stop means 80 and 82 are provided to prevent undesired movement of the release rod 40 toward its locking position. Each stop means 80 and 82 is identical, and FIG. 9 is therefore a showing which can be taken as either stop means 80 or 82. With particular reference to FIG. 9, each stop means 80 or 82 comprises a C-shaped clamp 84 disposed about the underside of top rail 12 and provided with a pair of flanges which are rigidly secured to a horizontally oriented strap 86 by a pair of fastener assemblies 88 to securely anchor the stop means against movement relative to the top rail 12.

The stop means further includes a pair of vertical tabs 90 integral with the flanges of the clamp 84 and spaced apart to define a path through which the release rod 40 is normally slidable. A stop gate 92 is pivotally mounted to one of the tabs 90 and can be flipped over by the operator to close off the opening between the tabs 90 and thereby prevent movement of the release rod 40 past the gate 92.

The stop means 80 and 82 are useful in the operation of the present apparatus. More particularly, assuming that the handle assembly 48 has been operated to move the release rod 40 to its fully opened or second release position, as seen in FIG. 2, the operator can flip the gate 92 of stop means 80 to a closed position. This prevents the cattle from moving the release rod 40 to its locked position, as seen in FIG. 1. It has been found that when a number of cattle dip their heads downwardly in the head openings 22, the frictional drag of the coupling elements 38 is sometimes sufficient to move the release rod 40 to the right to its locked position. This is often not desired by the operator because in this position of the release 40 the cattle can lock themselves into the stanchions and the operator may not want this. In similar fashion, the stop means 82 can be operated to prevent the release rod 40 from being moved to the right by the cattle when the handle assembly 48 is in the position of FIG. 3.

Referring now to FIG. 14, the pivot pin 36 is located at the left extremity of the coupling element 38 rather than at the right extremity. The left extremity is the "leading" portion of the element 38 when the release stanchion 20 is pivoted in a counterclockwise direction toward its open position. It has been found that this location of the pin 36 at the extremity of the element 38 opposite the location of the pin 42 is important in that the pin 42 tends to be securely retained within the slot 44 when the release stanchion is rapidly moved toward its open position. In contrast, it has been found that when the pin 36 is located adjacent the right or trailing extremity of the element 38, as was the case in the above mentioned patent application Ser. No. 689,586, movement of the release stanchion in a counterclockwise direction toward its open position tended to rock the coupling element 38 such that the pin 42 undesirably popped out of the slot 44. When this occurred, it was no longer possible for the operator to thereafter move the release stanchion to its closed position by moving the release rod 40 to the right. That is, the effect of the dislodgement of the pin 42 from the slot 40 was to undesirably move the coupling element 38 from the position of FIG. 6 to that of FIG. 8, depriving the operator of the ability to lock the release stanchions through the release rod 40.

FIG. 14 also illustrates the flatness of the arc 46. Such flatness is desirable because the degree of upward movement of the coupling elements 38 is minimized as the release rod 40 is moved to the left. This is often important because it has been found that when the release rod 40 is moved suddenly to the left, the momentum of the locking elements 38 tends to cause them to "float" or move upwardly and keep traveling in a straight line direction, which has the effect of undesirably moving the pins 42 out of the slots 44. The flatness of the arc 46 is a result of the configuration of the bracket 34. More particularly, the vertical center line of the release stanchion is shown at 94, Y represents the distance of the pin 36 to the right of the center line 94, and X represents the extent of travel of the pin 36 to the left to reach its position when the stanchion 20 is open. By configuring the bracket 34 to locate the pivot pin 36 to the right of the center line 94 a distance substantially equal to the distance it must travel upon movement of the stanchion to its open position, the height of the arc 46 above a horizontal plane is minimized.

FIG. 14 is further illustrative of the provision of additional openings 96 in the bracket 34 to enable relocation of the position of the pivot pin 36 as desired. For example, if it is desired that the pin 42 be urged out of the slot earlier, that is, after a shorter travel of the release rod 40 to the left, the pin 58 will have to engage the upper surface of the top rail 12 at an earlier time. To do so the pin 36 can be located from the position illustrated in FIG. 14 to one of the openings 96 to the left of the illustrated position. In similar fashion, relocation of the pivot pin 36 to the right of its illustrated location will have the opposite effect.

Referring now to FIGS. 10 and 11, there is illustrated a second embodiment of the present cattle locking apparatus. This embodiment is identical to the first embodiment in construction and operation except for the character of the release stanchion and its associated actuating means. In particular, the operation and interaction of the pivot pin 46, coupling element 38, release rod 40, locking handle assembly 48, and stop link 60 are the same in both embodiments. Identical elements are assigned like numbers, while non-identical elements having functions similar to that of the first embodiment are assigned like numbers with the letter "a."

The release stanchion 30a is pivoted for movement about an axis passing through its base 72. The construction of the base 72 and the associated bottom rail 14 to permit such pivotal movement is more particularly described in my copending patent application Ser. No. 613,169.

Release stanchion 30a includes an actuator comprising a tubular rail 32a integrally secured at its left end to a sleeve 74 which is vertically slidable upon the release stanchion 20 and secured in a vertically adjusted position by a thumbscrew 76 which can be tightened to bear against the stanchion 20. The proper position locates the actuator 32a in the head opening 22 for engagement by the neck of an animal when it dips its head to feed. The position of the animal's neck is represented at 78 in FIG. 10. The free end of the actuator 32a is C-shaped to straddle the fixed stanchion 18 and thereby permit free movement of the actuator 32a relative to the stanchion 18 without any opening being present within which the animal could become wedged.

When the animal dips its head to feed from a receptacle (not shown) located below the bottom rail 14 its neck engages the actuator 32a and moves it from the phantom position to the full line position illustrated in FIG. 10. This movement of the actuator 32a pivots the release stanchion 30a in a clockwise direction to the full line, closed position illustrated in FIG. 10. In this position the release stanchion 30a becomes releasably coupled to the release rod 40, as previously described in connection with the first embodiment, so that it cannot be moved by the animal, thereby locking the animal in feeding position.

The foregoing arrangement is useful where a release rod is utilized which has slots 44 without any ramp portions 62, that is with both ends of each slot 44 undercut so that the associated pin 42 tends to be retained in the slot no matter in which direction the operator moves the release rod. With such a release rod, and using a release stanchion like that of the first embodiment, when the operator wishes to move the release rod 40 to move the release stanchions 20 to the left, to thereby release the feeding cattle, the stanchion portions 32 can be moved only by pressing them against the sides of the animals' necks to force them away from the feeding trough. The animals resist this and consequently such pivotal movement of the release stanchions 20 to open positions while the animals are feeding is sometimes difficult. With the arrangement of FIG. 10, the actuators 32a are pressed upwardly against the animals' necks upon movement of the release rod 40 toward its open position. This makes it easier to move the animals away from their feeding positions, particularly because the long leverage arm of the release stanchion 30a is now utilized. That is, instead of pressing against the sides of the animals' necks, the stanchions 30a are utilized as lever arms to move the much shorter actuators 32a, which greatly reduces the amount of effort required.

Referring now to FIGS. 15 through 17, there is illustrated another embodiment of the present locking apparatus. This embodiment is identical to the first embodiment in construction and operation except for the configuration of the release stanchion, and except for the provision of an emergency release mechanism. Identical elements are therefore assigned like numbers, while nonidentical elements having functions similar to that of the first embodiment are assigned like numbers with the letter "b".

The upper portion of the tubing 28b is offset to the left relative to the pivot bracket 26b for the release stanchion 20, but instead of the lower portion of the tubing 28b being vertically oriented, it is also offset to the left as illustrated. Thus, instead of only the upper portion of the head opening 22 being enlarged, the lower portion is also enlarged.

Assuming that the release rod 40 is in its locking position, corresponding to the locking position it takes in the first embodiment in FIG. 1, any feeding cattle will be locked in the stanchion with their heads in the lower portion feeding from the adjacent feed trough (not shown). In order to keep an animal from releasing itself from this position by pushing the release stanchion lower portion 32 to the left, and thereby enlarging the opening 22 sufficiently to withdraw its head, a short, normally vertically oriented section of tubing 96 is interposed adjacent the stanchion lower portion 32 to normally act as a stop to prevent such movement. The tubing 96 is welded to a bracket 98 of inverted U-shape which straddles the bottom rail 14. The opposite legs of the bracket 98 are pivotally secured to a band 100 which encircles the bottom rail 14.

The tubing 96 is prevented from being moved to the left because of the interfering engagement between the edge of the bracket 98 and the top of the bottom rail 14. This embodiment has utility in those instances when an animal has fallen with its head twisted between the fixed stanchion 18 and the stanchion lower portion 32. Normally, the animal would have to be moved so that its head was vertically oriented for movement into the upper portion of the head opening 22 for release. However, with the embodiment of FIGS. 15 through 17, the operator can kick or otherwise push against the tubing 96 to rotate the bracket 100 about the longitudinal axis of the bottom rail 14 and thereby pivot the tubing 96. The stanchion lower portion 32 can then be pivoted to enlarge the lower portion of the head opening 22 for easier removal of the fallen animal's head.

Referring now to FIGS. 18 through 23, there is illustrated another embodiment of the present locking apparatus. This embodiment is substantially identical in construction and operation to the embodiment first described except for the particular interconnection between the release stanchion and the coupling element. Accordingly, identical elements are assigned like numbers, while non-identical elements having functions similar to that of the first embodiment are assigned like numbers with the subscript "c."

As was the case in the operation of the embodiment of FIG. 1, when the release rod 40 is in its fully locked position, as illustrated in FIG. 18, an animal placing its head in the opening 22 effects pivotal movement of the release stanchion 20 on dipping its head to feed. This pivotal movement is from the position of FIG. 19 to the locking position of FIG. 18.

In the locking position of the release stanchion 20, the pin 42 of the coupling element 38 is receivable within the slot 44 to thereby lock the animal in the feeding stall without intervention of an operator.

In moving from the position of FIG. 19 to that of FIG. 18, the pivot pin 36 of the embodiment of FIG. 1 moves through an arc, as best seen in FIG. 14, raising the release rod 40. A full-grown animal such as a mature cow has no difficulty in raising the release rod 40 during pivotal movement of the release stanchion between the positions illustrated in FIG. 14. However, young animals such as calves are sometimes not able to lift the weight of the release rod 40 and consequently are unable to effect pivotal movement of the release stanchion 20 between its open and closed positions. The embodiment of FIGS. 18 through 23 enables easier pivotal movement of the release stanchion 20 by pivotal movement of the release stanchion 20 by eliminating any need for raising the release rod 40 to effect such pivotal movement.

More particularly, a U-shape bracket 34c is secured to the upper end of each release stanchion 20, the opposite legs of the bracket 34c straddling opposite sides of the top rail 12, as best seen in FIG. 21. The legs of the bracket 34c are provided with confronting, vertically elongated slots 102 which vertically slidably receive the opposite ends of the pivot pin 36. The pin 36 extends across the top of the rail 12 and through the opposite sides of the channel shape coupling element 38c.

With this arrangement, the pin 36 need not engage and raise the release rod 40 in order for the release stanchion 20 to move between its open and closed positions. Instead, as best seen in FIG. 23, the pin 36 slides downwardly relative to the slots 102, thereby enabling the release stanchion 20 to move from the position of FIG. 19 to that of FIG. 18 without raising the release rod 40.

From the foregoing it will be apparent that a cattle stanchion apparatus has been provided which is adapted to lock cattle in feeding position, either by operator actuation or by animal actuation, without the intervention of an operator.

Various modifications and changes may be made with regard to the foregoing detailed description without departing from the spirit of the invention.

I claim:

1. In cattle stanchion apparatus including a fixed stanchion; a release stanchion located adjacent and spaced from said fixed stanchion to define a head opening for an animal; and mounting means mounting said release stanchion for pivotal movement between open positions, in which the upper part of said head opening is enlarged to enable an animal to place its head through said head opening, and a closed position in which said head opening is narrowed to hold the animal's head in said head opening, the improvement comprising:

a generally horizontally elongated rail means overlying said release stanchion;

a bracket means carried at the upper extremity of said release stanchion;

release means including a generally horizontally elongated release member and handle means operative to move said release member between a locking position, a first release position, and a second release position, and having a detent; and a coupling element pivotally carried by said bracket means, movable along said release member upon pivotal movement of said release stanchion, and having a coupling portion releasably coupleable with said detent for movement with said release member to said first release position to thereby locate said release stanchion in an open position, and whereby said coupling element is movable with said release member upon movement of said release member from said first release position to said locking position, said coupling element further having a decoupling portion engageable with said rail means in said second release position of said release member, whereby said coupling portion can be decoupled from said detent of said release member when said release member is in said second release position to thereby enable movement of said release member to said locking position independently of said coupling element, and whereby subsequent movement of said release stanchion to its closed position by an animal is operative to move said coupling element and recouple said coupling portion and said detent to lock the animal in position.

2. The improvement according to claim 1 wherein said rail means comprises a top rail to which the upper extremities of said release stanchion and said fixed stanchion are attached.

3. The improvement according to claim 1 wherein said decoupling portion is a transversely oriented pin underlying said release member and overlying said rail means.

4. The improvement according to claim 1 wherein said bracket means includes a bracket portion extending toward said fixed stanchion, and wherein said coupling element is pivotally carried by said bracket portion whereby said coupling element is pivotable about a pivot axis laterally offset relative to the longitudinal axis of said release stanchion.

5. The improvement according to claim 4 wherein said bracket portion includes a plurality of mounting openings for selectively pivoting said coupling element at one of several distances from said longitudinal axis of said release stanchion whereby the point of engagement between said decoupling portion and said rail means can be altered to thereby adjust the point of decoupling of said coupling portion from said detent upon movement of said release member toward its release positions.

6. The improvement according to claim 1 wherein said handle means includes first stop means selectively operative to prevent said handle means from operating to move said release member from said first release position to said second release position.

7. The improvement according to claim 1 and including second stop means on said rail means selectively operable to prevent movement of said release member from said second release position to said locking position.

8. The improvement according to claim 1 and including third stop means on said rail means selectively operable to prevent movement of said release member from said first release position to said locking position.

9. The improvement according to claim 1 wherein said coupling element is elongated, said bracket means is pivotally connected at one extremity of said coupling element, and said coupling portion is located at the opposite extremity of said coupling element, said opposite extremity extending in a direction toward said handle means.

10. The improvement according to claim 1 wherein said detent comprises an elongated slot having an undercut end wall and an opposite sloping end wall, said undercut end wall being operative to constrain said coupling portion against movement out of said detent during movement of said release member toward said locking position, said sloping end wall being operative to permit said coupling portion to slide out of said detent whereby said release stanchion is movable toward its closed position independently of said release member.

11. The improvement according to claim 10 and including bias means tending to maintain said coupling portion in said detent.

12. The improvement according to claim 1 wherein said release stanchion is pivoted adjacent its lower extremity, and wherein said release stanchion includes a lower portion projecting laterally across said head opening and normally underlying the animal's neck whereby said lower portion may be engaged by the animal's neck to pivot said release stanchion to its closed position.

13. The improvement according to claim 1 wherein said mounting means includes a vertically elongated element spaced from said fixed stanchion and laterally offset at its mid portion toward said release stanchion to define enlarged upper and lower head openings, said release stanchion being pivotally mounted to said mid portion; and including a stop structure selectively movable between a stop position for engaging said release stanchion and preventing movement of the lower portion thereof toward said elongated element, and an open position enabling said lower portion of said release stanchion to move toward said elongated element whereby an animal can withdraw its head from said enlarged lower head opening.

14. In cattle stanchion apparatus including a fixed stanchion; a release stanchion located adjacent and spaced from said fixed stanchion to define a head opening for an animal; means mounting said release stanchion for pivotal movement between an open position, in which the upper part of said head opening is enlarged to enable an animal to place its head through said head opening, and a closed position in which said head opening is narrowed to hold the animal's head in said head opening; and a generally horizontally elongated release member movable between a locking position and a release position, and having a detent;

a bracket carried at the upper extremity of said release stanchion and movable in an arcuate path during said pivotal movement of said release stanchion; and a coupling element movable along said release member upon pivotal movement of said release stanchion and cooperative with said release member for controlling the pivoted position of said release stanchion; and an elongated pivot element underlying said release member and pivotally connecting said bracket and said coupling element, one of said bracket and said coupling element including vertical slots within which said pivot element is movable whereby engagement of said release member by said pivot element during said pivotal movement of said release stanchion results in related movement of said pivot element in said slots rather than vertical movement of said release member.

15. The improvement according to claim 14 wherein said slots are located in said bracket.

* * * * *